United States Patent
Felisati et al.

(10) Patent No.: US 11,951,721 B2
(45) Date of Patent: *Apr. 9, 2024

(54) BOPP MULTILAYER FILM

(71) Applicant: BASELL POLIOLEFINE ITALIA S.R.L., Milan (IT)

(72) Inventors: Andrea Felisati, Ferrara (IT); Marco Izzi, Frankfurt (DE); Paola Massari, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 412 days.

This patent is subject to a terminal disclaimer.

(21) Appl. No.: 17/311,076

(22) PCT Filed: Nov. 18, 2019

(86) PCT No.: PCT/EP2019/081638
§ 371 (c)(1),
(2) Date: Jun. 4, 2021

(87) PCT Pub. No.: WO2020/114760
PCT Pub. Date: Jun. 11, 2020

(65) Prior Publication Data
US 2022/0032593 A1    Feb. 3, 2022

(30) Foreign Application Priority Data

Dec. 5, 2018  (EP) .................................. 18210379

(51) Int. Cl.
| | |
|---|---|
| *B32B 27/32* | (2006.01) |
| *B32B 27/08* | (2006.01) |
| *C08K 5/1575* | (2006.01) |
| *C08L 23/12* | (2006.01) |
| *C08L 23/14* | (2006.01) |

(52) U.S. Cl.
CPC .............. *B32B 27/32* (2013.01); *B32B 27/08* (2013.01); *C08K 5/1575* (2013.01); *C08L 23/12* (2013.01); *C08L 23/142* (2013.01); *B32B 2250/03* (2013.01); *B32B 2250/242* (2013.01); *B32B 2270/00* (2013.01); *B32B 2307/308* (2013.01); *B32B 2307/518* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 10,759,933 B2* | 9/2020 | Massari | C08L 23/12 |
| 2014/0336334 A1 | 11/2014 | Marzolla et al. | |
| 2016/0276105 A1* | 9/2016 | Qi | B32B 27/34 |
| 2017/0313865 A1* | 11/2017 | Wang | C08L 23/16 |

FOREIGN PATENT DOCUMENTS

| | | |
|---|---|---|
| CN | 108779307 A | 11/2018 |
| NO | 2006065664 A1 | 6/2006 |
| WO | 0160607 A1 | 8/2001 |
| WO | 2018069127 A1 | 4/2018 |

OTHER PUBLICATIONS

International Search Report and Written Opinion dated Jan. 14, 2020 (Jan. 14, 2020) for Corresponding PCT/EP2019/081638.

* cited by examiner

*Primary Examiner* — Ramsey Zacharia

(57) ABSTRACT

A BOPP multilayer film having at least three layers made from or containing a nucleated propylene polymer composition having:
  A) from 77 wt % to 91 wt %, of a propylene homopolymer having a fraction insoluble in xylene at 25° C. higher than 95%;
  B) from 9 wt % to 23 wt %, of a copolymer of propylene with from 28.0 wt % to 42.0 wt % of ethylene derived units; and
  C) a nucleating agent selected from aromatic or aliphatic carboxylic acids, aromatic metal phosphates, sorbitol derivatives and talc,
wherein the composition has an intrinsic viscosity (IV) of the fraction soluble in xylene at 25° C. between 1.0 dl/g and 1.9 dl/g, a fraction soluble (Xs) in xylene at 25° C. between 9.0 wt % and 21.0 wt %, a total melt flow rate (MFR) between 1.5 and 5 g/10 min and the value of the relation (I):

$$22.5 + 0.2*MFR - 1.2*Xs + 0.2*IV \qquad (I)$$

higher than 5.9.

14 Claims, No Drawings

BOPP MULTILAYER FILM

This application is the U.S. National Phase of PCT International Application PCT/EP2019/081638, filed Nov. 18, 2019, claiming benefit of priority to European Patent Application No. 18210379.6, filed Dec. 5, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a biaxially oriented polypropylene (BOPP) multilayer film.

BACKGROUND OF THE INVENTION

Isotactic polypropylene has many uses. In some instances and to improve the properties of isotactic polypropylene, a stereoregular homopolymerization process has been introduced one or more copolymerization steps or one or more monomers have been introduced into the homopolymer matrix.

SUMMARY OF THE INVENTION

In a general embodiment, the present disclosure provides a biaxially oriented polypropylene (BOPP) multilayer film having at least three layers wherein each layer is made from or containing a nucleated propylene polymer composition made from or containing:
A) from 77 wt % to 91 wt %, of a propylene homopolymer having a fraction insoluble in xylene at 25° C. higher than 95%, based upon the total weight of the propylene homopolymer;
B) from 9 wt % to 23 wt %, of a copolymer of propylene having from 28.0 wt % to 42.0 wt % of ethylene derived units, based upon the total weight of the propylene copolymer; and
C) from 300 ppm to 5000 ppm with respect to the total composition, of a nucleating agent selected from the group consisting of aromatic or aliphatic carboxylic acids, aromatic metal phosphates, sorbitol derivatives and talc,
wherein the nucleated propylene polymer composition has (i) an intrinsic viscosity of the fraction soluble in xylene at 25° C. between 1.0 dl/g and 1.9 dl/g, (ii) a fraction soluble in xylene at 25° C. between 9.0 wt % and 21.0 wt %, based upon the total weight of the nucleated propylene polymer composition, (iii) a total melt flow rate (Melt Flow Rate according to ISO 1133, condition L, that is, 230° C. and 2.16 kg load) between 1.5 and 5 g/10 min, and (iv) a value of the relation (I):

$$22.5+0.2*MFR-1.2*Xs+0.2*IV \quad (I)$$

higher than 5.9, wherein
MFR is the melt flow rate of the nucleated propylene polymer composition (Melt Flow Rate according to ISO 1133, condition L, that is, 230° C. and 2.16 kg load);
IV is the intrinsic viscosity of the fraction soluble in xylene at 25° C.; and
Xs is the fraction soluble in xylene at 25° C.; and
wherein the amount of A+B is equal to 100 wt %.

DETAILED DESCRIPTION OF THE INVENTION

In some embodiments, the present disclosure provides a biaxially oriented polypropylene (BOPP) multilayer film having at least three layers wherein each layer is made from or containing a nucleated propylene polymer composition made from or containing:
A) from 77 wt % to 91 wt %, alternatively from 80 wt % to 90 wt %, alternatively from 83 wt % to 89 wt %, of a propylene homopolymer having a fraction insoluble in xylene at 25° C., higher than 95%, alternatively higher than 96 wt %, based upon the total weight of the propylene homopolymer;
B) from 9 wt % to 23 wt %, alternatively from 10 wt % to 20 wt %, alternatively from 11 wt % to 17 wt %, of a copolymer of propylene having from 28.0 wt % to 42.0 wt %, alternatively from 31.0 wt % to 39.0 wt %, alternatively from 32.0 wt % to 38.0 wt %, of ethylene derived units, based upon the total weight of the propylene copolymer; and
C) from 300 ppm to 5000 ppm, alternatively from 500 ppm to 3000 ppm, alternatively from 900 ppm to 1500 ppm, with respect to the total composition, of a nucleating agent selected from the group consisting of aromatic or aliphatic carboxylic acids, aromatic metal phosphates, sorbitol derivatives and talc, alternatively selected from the group consisting of dibenzylidene sorbitol compounds, sodium benzoate, talc, metal salts of cyclic phosphoric esters, metal salts of hexahydrophthalic acid, and the unsaturated compound of disodium bicyclo [2.2.1] heptene dicarboxylate,
wherein the nucleated propylene polymer composition has (i) an intrinsic viscosity of the fraction soluble in xylene at 25° C. between 1.0 dl/g and 1.9 dl/g, alternatively from 1.2 dl/g to 1.7 dl/g, (ii) a fraction soluble in xylene at 25° C. between 9.0 wt % and 21.0 wt %, alternatively between 11.0 wt % and 18.0 wt %, alternatively between 12.0 wt % and 16.0 wt %, based upon the total weight of the nucleated propylene polymer composition, (iii) a total melt flow rate (Melt Flow Rate according to ISO 1133, condition L, that is, 230° C. and 2.16 kg load) between 1.5 and 5 g/10 min, alternatively between 2.5 and 4.5 g/10 min, and (iv) a value of the relation (I):

$$22.5+0.2*MFR-1.2*Xs+0.2*IV \quad (I)$$

higher than 5.9, alternatively between 6.1 and 7.3, alternatively between 6.4 and 7.2, alternatively between 6.6 and 7.0;
wherein
MFR is the melt flow rate of the nucleated propylene polymer composition (Melt Flow Rate according to ISO 1133, condition L, that is, 230° C. and 2.16 kg load);
IV is the intrinsic viscosity of the fraction soluble in xylene at 25° C.; and
Xs is the fraction soluble in xylene at 25° C.;
wherein the amount of A+B is equal to 100 wt %.

In some embodiments, the dibenzylidene sorbitol compounds are selected from the group consisting of unsubstituted dibenzylidene sorbitol (DBS), p-methyldibenzylidene sorbitol (MDBS), and 1,3-O-2, 4-bis (3, 4-dimethylbenzylidene) sorbitol (DMDBS), available from Milliken under the trade name Millad 3988. In some embodiments, the metal salts of cyclic phosphoric esters are selected from the group consisting of sodium 2, 2'-methylene-bis-(4, 6-di-tert-butylphenyl) phosphate (from Asahi Denka Kogyo K. K., under tradename NA-11) and cyclic bis-phenol phosphates (such as NA-21, also available from Asahi Denka). In some embodiments, the metal of the metal salts of hexahydrophthalic acid is calcium. In some embodiments, the unsaturated compound of disodium bicyclo [2.2. 1] heptene dicarboxylate is available under tradename HPN-68 from Milliken. In some embodiments, the nucleating agent is a dibenzylidene sorbitol derivative. In some embodiments, the nucleating agent is 1,3-O-2, 4-bis (3, 4-dimethylbenzylidene) sorbitol (DMDBS) available from Milliken under the trade name Millad 3988.

As used herein, the term "copolymer" refers to polymers consisting of propylene and ethylene.

In some embodiments, the BOPP multilayer films of the present disclosure have at least three layers, wherein each layer is made from or containing the same propylene polymer composition. Each layer contains at least 90 wt %, alternatively 95 wt %, alternatively 98 wt %, alternatively 99 wt %, of the nucleated propylene polymer composition. In some embodiments, the remaining components are additives. In some embodiments, the additives are selected from the group consisting of antioxidants, slip agents antifog agents, and thermostabilizers.

The combination and number of layers of the multilayer structures are not limited. In some instances, the multilayer structure has 3-11 layers or more, alternatively 3-9 layers, alternatively 3-7 layers, alternatively 3-5 layers.

In some embodiments, the multilayer film has a tensile modulus higher than 1550 MPa, alternatively between 1550 MPa and 2200 MPa.

In some embodiments, the multilayer film has a tear resistance measured in the machine direction higher than 2.0N, alternatively between 2.3N and 6.0N.

In some embodiments, the multilayer film has a puncture resistance max force higher than 25N, alternatively between 30N and 70N.

In some embodiments, the nucleated propylene polymer compositions is prepared by sequential polymerization in at least two stages, with each subsequent polymerization stage being conducted in the presence of the polymeric material formed in the immediately preceding polymerization reaction. In some embodiments, the polymer (A) is prepared in at least one first polymerization stage. In some embodiments, the copolymer (B) is prepared in at least one second polymerization stage. In some embodiments, the nucleating agent is added during the compounding process together with the other additives.

In some embodiments, each polymerization stage is carried out in presence of a highly stereospecific heterogeneous Ziegler-Natta catalyst. In some embodiments, the Ziegler-Natta catalysts are made from or containing a solid catalyst component made from or containing a titanium compound having a titanium-halogen bond and an electron-donor compound (internal donor), both supported on magnesium chloride. In some embodiments, the Ziegler-Natta catalysts systems are further made from or containing an organoaluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. W000163261.

In some embodiments, the solid catalyst component is made from or containing Mg, Ti, halogen and an electron donor selected from succinates of formula (I):

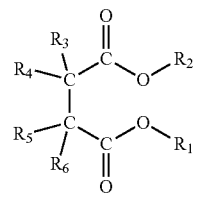

(I)

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the Periodic Table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms. In some embodiments, the radicals $R^3$ to $R^6$, which are joined to the same carbon atom, form a cycle.

In some embodiments, $R^1$ and $R^2$ are selected from the group consisting of $C_1$-$C_8$ alkyl, cycloalkyl, aryl, arylalkyl and alkylaryl groups.

In some embodiments, $R^1$ and $R^2$ are selected from primary alkyls, alternatively branched primary alkyls. In some embodiments, $R^1$ and $R^2$ groups are selected from the group consisting of methyl, ethyl, n-propyl, n-butyl, isobutyl, neopentyl, and 2-ethylhexyl. In some embodiments, $R^1$ and $R^2$ groups are selected from the group consisting of ethyl, isobutyl, and neopentyl.

In some embodiments, $R^3$ to $R^5$ are hydrogen and $R^6$ is a branched alkyl, cycloalkyl, aryl, arylalkyl and alkylaryl radical having from 3 to 10 carbon atoms. In some embodiments, at least two radicals from $R^3$ to $R^6$ are different from hydrogen and selected from $C_1$-$C_{20}$ linear or branched alkyl, alkenyl, cycloalkyl, aryl, arylalkyl or alkylaryl group, optionally containing heteroatoms belonging to groups.

In some embodiments, the two radicals different from hydrogen are linked to the same carbon atom. In some embodiments, the at least two radicals different from hydrogen are linked to different carbon atoms, that is (a) $R^3$ and $R^5$ or (b) $R^4$ and $R^6$.

In some embodiments, the solid catalyst component is prepared by reacting a titanium compound of formula $Ti(OR)_{n-y}X_y$ where n is the valence of titanium and y is a number between 1 and n with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts is as described in U.S. Pat. Nos. 4,399,054 and 4,469,648. In some embodiments, the adduct is directly reacted with the Ti compound or subjected to thermal controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or as such) in cold TiCl$_4$; the mixture is heated up to 80-130° C. and kept at this temperature for 0.5-2 hours. In some embodiments, the temperature of the cold TiCl$_4$ is 0° C. In some embodiments, the treatment with TiCl$_4$ is carried out one or more times. In some embodiments, the internal donor is added during the treatment with TiCl$_4$. In some embodiments, the treatment with the electron donor compound is repeated one or more times. In some embodiments, the succinate of formula (I) is used in molar ratio with respect to the MgCl$_2$ of from 0.01 to 1, alternatively from 0.05 to 0.5. In some embodiments, the preparation of catalyst components in spherical form is as described in European Patent Application No. EP-A-395083 or Patent Cooperation Treaty Publication No. WO98144001. In some embodiments, the solid catalyst components show a surface area (by B.E.T. method) between 20 and 500 m$^2$/g, alternatively between 50 and 400 m2/g, and a total porosity (by B.E.T. method) higher than 0.2 cm$^3$/g, alternatively between 0.2 and 0.6 cm3/g. In some embodiments, the porosity (Hg method) due to pores with radius up to 10.000 A ranges from 0.3 to 1.5 cm3/g, alternatively from 0.45 to 1 cm3/g.

In some embodiments, the organo-aluminum compound is an alkyl-Al selected from the trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the trialkylaluminum is mixed with alkylaluminum halides, alkylaluminum hydrides or alkylaluminum sesquichlorides. In some embodiments, the alkylaluminum sesquichlorides are selected from the group consisting of AlEt$_2$Cl and Al$_2$Et$_3$Cl$_3$.

In some embodiments, the external electron-donor compounds are selected from the group consisting of silicon compounds, ethers, esters, amines, heterocyclic compounds, ketones and the 1,3-diethers. In some embodiments, the ester is ethyl 4-ethoxybenzoate. In some embodiments, the external electron-donor compound is 2,2,6,6-tetramethyl piperidine. In some embodiments, the external donor compounds are silicon compounds of formula $R_a^5R_b^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1-trifluoropropyl-2-ethylpiperidinyl-dimethoxysilane, and 1,1,1-trifluoropropyl-methyldimethoxysilane. In some embodiments, the external electron donor compound is used in an amount to give a molar ratio between the organo-aluminum compound and the electron donor compound of from 0.1 to 500.

In some embodiments, the polymerization process is carried out in gas phase or in liquid phase, in continuous or batch reactors, such as fluidized bed or slurry reactors. In some embodiments, the polymerization of the propylene polymer (A) is carried out in liquid phase, using liquid propylene as diluent, while the copolymerization stage to obtain the propylene copolymer fraction (B) is carried out in gas phase, without intermediate stages except for the partial degassing of the monomers. In some embodiments, the sequential polymerization stages are carried out in gas phase. In some embodiments, the temperature for the preparation of fraction (A) and (B) are the same or different and from 50° C. to 120° C. In some embodiments, the polymerization pressure ranges from 0.5 to 30 MPa and the polymerization is carried out in gas-phase. In some embodiments, the catalytic system is pre-contacted (pre-polymerized) with small amounts of olefins. In some embodiments, the molecular weight of the propylene polymer composition is regulated. In some embodiments, the molecular weight regulator is hydrogen.

In some embodiments and in the second stage of the polymerization process, the propylene/ethylene copolymer (B) is produced in a fluidized-bed gas-phase reactor in the presence of the polymeric material and the catalyst system coming from the preceding polymerization step. In some embodiments, the nucleated propylene polymer compositions is further made from or containing additives. In some embodiments, the additives are selected from the group consisting of antioxidants, light stabilizers, antiacids, colorants and fillers.

In some embodiments, the nucleated propylene polymer compositions presents an X-ray spectrum having a degree of crystallinity lower than 60% measured on rotating compression molded DMTA plaques.

The following examples are given to illustrate and not to limit the present disclosure

EXAMPLES

The data of the propylene polymer materials were obtained according to the following methods:

Xylene-Soluble Faction at 25° C.

The Xylene Soluble fraction was measured according to ISO 16152, 2005, but with the following deviations (between parentheses is prescribed by the ISO 16152) The solution volume was 250 ml (200 ml).

During the precipitation stage at 25° C. for 30 min, the solution, for the final 10 minutes, was kept under agitation by a magnetic stirrer (30 min, without any stirring at all).

The final drying step was under vacuum at 70° C. (100° C.).

The content of the xylene-soluble fraction is expressed as a percentage of the original 2.5 grams and then, by difference (complementary to 100), the xylene insoluble %.

Ethylene (C2) Content $^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the S$_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal standard at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100T_{\beta\beta}/S \quad PPE=100T_{\beta\delta}/S \quad EPE=100T_{\delta\delta}/S$$

$$PEP=100S_{\beta\beta}/S \quad PEE=100S_{\beta\delta}/S \quad EEE=100(0.25S_{\gamma\delta}+0.5S_{\delta\delta})/S$$

$$S=T_{\beta\beta}+T_{\beta\delta}+T_{\delta\delta}+S_{\beta\beta}+S_{\beta\delta}+0.25S_{\gamma\delta}+0.5S_{\delta\delta}$$

The molar percentage of ethylene content was evaluated using the following equation:

$$E \% \text{ mol}=100*[PEP+PEE+EEE]$$

The weight percentage of ethylene content was evaluated using the following equation:

$$E\% \text{wt.} = \frac{100 * E\% \text{ mol} * MW_E}{E\% \text{ mol} * MW_E + P\% \text{ mol} * MW_P}$$

where P % mol was the molar percentage of propylene content while $MW_E$ and $MW_P$ were the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536) as:

$$r_1r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of Propylene sequences was calculated as mm content from the ratio of the PPP mm$T_{\beta\beta}$ (28.90-29.65 ppm) and the whole $T_{\beta\beta}$ (29.80-28.37 ppm).
Ethylene C2 content was measured on the final composition. The ethylene content of component B) was calculated by using the formula C2tot=$X_B$C2$_B$ wherein $X_B$ is the amount of component B in the composition.
Molar Ratio of Feed Gasses
Determined by gas-chromatography
Melt Flow Rate (MFR)
The melt flow rate MFR of the polymer was determined according to ISO 1133 (230° C., 2.16 Kg).
Intrinsic Viscosity
Determined in tetrahydronaphthalene at 135° C.
X-Ray Diffraction
X ray spectra were recorded on compression molded DMTA plaques. To minimize the orientation of the crystallites, the spectrum was recorded on a rotating plaque. The calculation of degree of crystallinity was performed by using two phase model and single line fitting procedure. The degree of crystallinity of the polymer of example 1 was measured to be 58.0%
Haze—ASTM D1003-13
Gloss—ASTM D2457-13
Tensile Modulus on Film ASTM D882-02
Tear Resistance—ASTM D1004-13
Puncture Resistance
The strength and the deflection needed to punch a film with a prefixed geometry were measured by a punch with hemispheric head which pierces the sample at a speed of 20 mm/min.
Instruments:
dynamometer type (INSTRON mod. 4301 or similar) equipped with interchangeable 100 N and 1KN cells and interface device with personal computer,
high precision thickness gauge (type Mitutoyo) or similar,
strip chart recorder or data acquisition system for recording the stress-deformation curves (or stress-time),
sample rack in plexiglass with a 6 mm diameter-central hole for binding the sample hyperstatically, and
50 mm.-long-punch with a 4 mm.-diameter-hemispheric head.
Test Procedure
The films were conditioned at a temperature of 23° C. for a minimum period of 24 hours and no longer than 48 hours.
A 50 mm-wide and 200 mm.-long strip was cut from the film. The thickness was measured in 5 different points, at least 3 cm apart.
The sample was inserted in the sample rack holder which has a fastener system having two shaped plates with a central hole for the punching. The crossbar integral with the punch was placed such that the punch was as near as possible to the film; then the test was started at the prefixed speed and up to the break of the film.
The test was carried out on 5 different points of the sample, at least 3 cm. apart.
From the 5 tests, the average values of maximum strength, expressed in (N) was determine. Maximum strength is the maximum value of strength obtained by the film at break.

Example 1

Preparation of the Solid Catalyst

Into a 500 mL four-necked round flask, purged with nitrogen, 250 mL of TiCl$_4$ were introduced at 0° C. While stirring, 10.0 g of microspheroidal MgCl$_2$·2.1C$_2$H$_5$OH, having average particle size of 47 µm (prepared in accordance with the method described in example 1 of European Patent No. EP728769), and an amount of diethyl 2,3-diisopropylsuccinate in racemic form, to provide a Mg/succinate molar ratio of 24 were added. The temperature was raised to 100° C. and kept at this value for 60 min. The stirring was stopped. The liquid was siphoned off. The treatment with TiCl$_4$ was repeated at 110° C. for 30 min. After siphoning, fresh TiCl$_4$ and an amount of 9,9-bis(methoxymethyl)fluorene, to provide a Mg/diether molar ratio of 12, were added. The temperature was raised to 90° C. for 30 min. After sedimentation and siphoning at 85° C., the solid was washed six times with anhydrous hexane (6×100 ml) at 60° C.

Polymerization

The polymerization run was carried out in continuous mode in a series of two reactors equipped with devices to transfer the product from the first reactor to the second reactor. The first reactor was a liquid phase loop reactor, and the second was a fluidized bed gas-phase reactor. A propylene homopolymer was prepared in the liquid loop reactor while a propylene ethylene copolymer was prepared in the gas-phase reactor in the presence of the propylene homopolymer coming from the first reactor. Hydrogen was used as a molecular weight regulator. The gas phase (propylene, ethylene and hydrogen) was continuously analyzed via gas-chromatography. At the end of the run, the powder was discharged and dried under a nitrogen flow.

The main polymerization conditions and the analytical data relating to the polymers produced in the two reactors are reported in Table 1. Properties of the polymer are reported in Table 2.

TABLE 1

| PROCESS CONDITIONS | Ex. 1 |
|---|---|
| Precontact | |
| Temperature ° C. | 12 |
| Residence time (min) | 20 |
| Teal/donor ratio | 4.3 |
| Prepolymerization | |
| Temperature ° C. | 20 |
| Residence time (min) | 6.5 |
| Loop 1$^{st}$ reactor in liquid phase - propylene homopolymer | |
| Temperature, ° C. | 75 |
| Pressure, bar | 40 |
| Residence time, min | 53 |
| H2/C3 mol/ppm | 1320 |
| Split, wt % | 85 |
| Gas-Phase reactor - ethylene/propylene copolymerization | |
| Temperature, ° C. | 70 |
| Pressure, bar | 14 |
| Residence time, min | 18 |
| H2/C3 mol/mol | |
| H2/C2 mol/mol | 0.264 |
| C2/C2 + C3 mol/mol | 0.2 |
| split wt % | 15 |

C2 ethylene;
C3 propylene;
H2 hydrogen
*Amount of component B with respect to A + B
$C_2^-$ = ethylene
$C_3^-$ = propylene To the material obtained according to example 1, the following additives were added:

| | | Ex. 1 |
|---|---|---|
| Polymer composition of the example | wt % | 99.640 |
| Antioxidants | wt % | 0.1725 |
| Calcium stearate | wt % | 0.0575 |
| Millad 3988 | wt % | 0.1300 |

TABLE 2

| Example | | Ex. 1 |
|---|---|---|
| component A) | | |
| Xylene insolubles at 25° C. | % | >96 |
| % copolymer component B) | wt % | 14 |
| % $C_2^-$ component B) | wt % | 35.0 |
| properties of the composition | | |
| MFR of the composition | g/10 min | 3.1 |
| Xylene soluble at 25° C., Xs | wt % | 13.7 |
| XsIV | dl/g | 1.5 |
| relation (I) | | 7.0 |

$C_2^-$ = ethylene
XsIV = intrinsic viscosity of fraction soluble in xylene at 25° C.
n.m. = not measured Multilayer Film Example 1 and Comparative Example 2

The polymer of example 1 was used to prepare a three-layer BOPP film having a thickness of 30 μm. For the comparative example 2, a 30 μm A/B/A film wherein layer A is Adsyl 7623XCP sold by Lyondellbasell and layer B is the propylene polymer composition of example 1. The ratio among the three layers is 1-28-1. The stretching ration is 5×9 (MD×TD)

The properties of the films are reported in table 3.

TABLE 3

| | units | Ex 1 | Comp ex 2 |
|---|---|---|---|
| Haze | % | 4 | 5.2 |
| Gloss | GU | 73.7 | 72.8 |
| Tensile Modulus MD | N/mm$^2$ | 1640 | 1550 |
| TEAR RESISTANCE MD | N | 3.7 | 1.9 |
| Puncture resistance Max Force | N | 49 | 18.5 |

What is claimed is:

1. A biaxially oriented polypropylene multilayer film having at least three layers wherein each layer comprises a nucleated propylene polymer composition comprising:
   A) from 77 wt % to 91 wt %, of a propylene homopolymer having a fraction insoluble in xylene at 25° C. higher than 95%, based upon the total weight of the propylene homopolymer;
   B) from 9 wt % to 23 wt %, of a copolymer of propylene having from 28.0 wt % to 42.0 wt % of ethylene derived units, based upon the total weight of the propylene copolymer; and
   C) from 300 ppm to 5000 ppm with respect to the nucleated propylene polymer composition, of a nucleating agent selected from the group consisting of aromatic or aliphatic carboxylic acids, aromatic metal phosphates, sorbitol derivatives and talc,
   wherein the nucleated propylene polymer composition has (i) an intrinsic viscosity of the fraction soluble in xylene at 25° C. between 1.0 dl/g and 1.9 dl/g, (ii) a fraction soluble in xylene at 25° C. between 9.0 wt % and 21.0 wt %, based upon the total weight of the nucleated propylene polymer composition, (iii) a total melt flow rate (Melt Flow Rate according to ISO 1133, condition L, that is, 230° C. and 2.16 kg load) between 1.5 and 5 g/10 min, and (iv) a value of the relation (I):

$$22.5+0.2*MFR-1.2*Xs+0.2*IV \quad (I)$$

higher than 5.9; wherein
MFR is the melt flow rate of the nucleated propylene polymer composition (Melt Flow Rate according to ISO 1133, condition L, that is, 230° C. and 2.16 kg load);
IV is the intrinsic viscosity of the fraction soluble in xylene at 25° C.; and
Xs is the fraction soluble in xylene at 25° C.; and
wherein the amount of A+B is equal to 100 wt %.

2. The biaxially oriented polypropylene multilayer film according to claim 1, wherein, in the nucleated propylene polymer composition, component A) is from 80 wt % to 90 wt % and component B) is from 10 wt % to 20 wt %, wherein the amount of A+B is equal to 100 wt %.

3. The biaxially oriented polypropylene multilayer film according to claim 1, wherein, in the nucleated propylene polymer composition, the fraction insoluble in xylene at 25° C. of component A) is higher than 96 wt %%, based upon the total weight of the propylene homopolymer.

4. The biaxially oriented polypropylene multilayer film according to claim 1, wherein, in the nucleated propylene polymer composition, the ethylene derived units of component B) are from 31.0 wt % to 39.0 wt %, based upon the total weight of the propylene copolymer.

5. The biaxially oriented polypropylene multilayer film according to claim 1, wherein, in the nucleated propylene polymer composition, (i) the intrinsic viscosity of the fraction soluble in xylene at 25° C. is between 1.2 dl/g to 1.7 dl/g.

6. The biaxially oriented polypropylene multilayer film according claim 1, wherein, in the nucleated propylene polymer composition, (ii) the fraction soluble in xylene at 25° C. is between 11.0 wt % to 18.0 wt %, based upon the total weight of the nucleated propylene polymer composition.

7. The biaxially oriented polypropylene multilayer film according to claim 1, wherein, in the nucleated propylene polymer composition, (iii) the total melt flow rate (Melt Flow Rate according to ISO 1133, condition L, that is, 230° C. and 2.16 kg load) is between 2.5 and 4.5 g/10 min.

8. The biaxially oriented polypropylene multilayer film according to claim 1, wherein, in the nucleated propylene polymer composition, (iv) the value of the relation (I) is between 6.1 and 7.3.

9. The biaxially oriented polypropylene multilayer film according to claim 1, wherein, in the nucleated propylene polymer composition, (iv) the value of the relation (I) is between 6.4 and 7.2.

10. The biaxially oriented polypropylene multilayer film according to claim 1 having three layers.

11. The biaxially oriented polypropylene multilayer film according to claim 1, wherein, in the nucleated propylene polymer composition, the nucleating agent is selected from dibenzylidene sorbitol compounds.

12. The biaxially oriented polypropylene multilayer film according to claim 1, wherein, in the nucleated propylene polymer composition, the nucleating agent is 1,3-O-2, 4-bis (3, 4-dimethylbenzylidene) sorbitol (DMDBS).

13. The biaxially oriented polypropylene multilayer film according to claim 1, wherein, in the nucleated propylene polymer composition, the amount of C) nucleating agent ranges from 500 ppm to 3000 ppm with respect to the nucleated propylene polymer composition.

14. The biaxially oriented polypropylene multilayer film according to claim 1, wherein, in the nucleated propylene polymer composition, the amount of C) nucleating agent ranges from 900 ppm to 1500 ppm with respect to the nucleated propylene polymer composition.

* * * * *